(12) United States Patent
Yamaguchi et al.

(10) Patent No.: US 12,432,418 B2
(45) Date of Patent: Sep. 30, 2025

(54) INFORMATION PROCESSING DEVICE, INFORMATION PROCESSING METHOD, AND RECORDING MEDIUM

(71) Applicant: Panasonic Intellectual Property Management Co., Ltd., Osaka (JP)

(72) Inventors: Masaki Yamaguchi, Osaka (JP); Isao Ueda, Osaka (JP); Yasushi Uesaka, Hyogo (JP); Seigo Okazaki, Osaka (JP); Masahiro Muikaichi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/694,238

(22) PCT Filed: Sep. 7, 2022

(86) PCT No.: PCT/JP2022/033507
§ 371 (c)(1),
(2) Date: Mar. 21, 2024

(87) PCT Pub. No.: WO2023/047953
PCT Pub. Date: Mar. 30, 2023

(65) Prior Publication Data
US 2024/0388763 A1    Nov. 21, 2024

(30) Foreign Application Priority Data
Sep. 22, 2021   (JP) .................. 2021-154871

(51) Int. Cl.
*H04N 21/442* (2011.01)
*H04N 21/45* (2011.01)
(52) U.S. Cl.
CPC ... *H04N 21/44222* (2013.01); *H04N 21/4532* (2013.01)

(58) Field of Classification Search
CPC ......... H04N 21/44222; H04N 21/4532; H04N 21/4334; H04N 21/4345; H04N 21/4668; H04N 21/47214; H04N 21/4826
See application file for complete search history.

(56) References Cited

U.S. PATENT DOCUMENTS 6,851,090 B1 * 2/2005 Gutta ................. H04N 21/4532
348/E7.061
2006/0130096 A1   6/2006 Aoki et al.
(Continued)

FOREIGN PATENT DOCUMENTS

JP    2006-060600 A    3/2006

OTHER PUBLICATIONS

International Search Report dated Nov. 22, 2022 issued in International Patent Application No. PCT/JP2022/033507, with English translation.

(Continued)

*Primary Examiner* — Oschta I Montoya
(74) *Attorney, Agent, or Firm* — Rimon P.C.

(57) ABSTRACT

An information processing device includes: an obtainer that obtains a ranking score assigned to each of a plurality of items of target broadcast content; a preference outputter that outputs preference information based on a viewing history of one or more items of broadcast content viewed by a user, the preference information being related to a preference of the user for each of the one or more items of broadcast content; an evaluator that assigns a preference score to each of the plurality of items of target broadcast content; and an order outputter that outputs order information based on the ranking score and the preference score, the order information being related to an order of the plurality of items of target broadcast content arranged according to the preference of the user.

6 Claims, 5 Drawing Sheets

|  | Ranking score | Preference score | Updated ranking |
|---|---|---|---|
| Content 1 | 10 (1st) | 4 | 2nd |
| Content 2 | 9 (2nd) | 6 | 3rd |
| Content 3 | 8 (3rd) | 8 | 1st |
| Content 4 | 7 (4th) | 3 | 5th |
| Content 5 | 6 (5th) | 5 | 4th |
| ⋮ |  |  |  |

First threshold: 7.5    Second threshold: 3.5

(56) References Cited

U.S. PATENT DOCUMENTS

2013/0167168 A1* 6/2013 Ellis ................... H04N 21/458
 725/12
2016/0147307 A1* 5/2016 Masuko ............... G06F 40/129
 715/863

OTHER PUBLICATIONS

Extended European Search Report dated Jun. 17, 2024 issued in the corresponding European Patent Application No. 22872709.5.

* cited by examiner

FIG. 3

|         | Tag A | Tag B | Tag C | Tag D | ... |
|---------|-------|-------|-------|-------|-----|
| Content 1 | 1 | 0 | 0 | 0 | |
| Content 2 | 1 | 1 | 0 | 0 | |
| Content 3 | 0 | 1 | 1 | 1 | |
| Content 4 | 1 | 1 | 1 | 0 | |
| ⋮ | | | | | |

FIG. 4

|           | Ranking score | Preference score | Total score |
|-----------|---------------|------------------|-------------|
| Content 1 | 10 (1st)      | 4                | 14          |
| Content 2 | 9 (2nd)       | 6                | 15          |
| Content 3 | 8 (3rd)       | 8                | 16          |
| Content 4 | 7 (4th)       | 3                | 10          |
| Content 5 | 6 (5th)       | 5                | 11          |
| ⋮         |               |                  |             |

FIG. 5

|           | Ranking score | Preference score | Updated ranking |
|-----------|---------------|------------------|-----------------|
| Content 1 | 10 (1st)      | 4                | 2nd             |
| Content 2 | 9 (2nd)       | 6                | 3rd             |
| Content 3 | 8 (3rd)       | 8                | 1st             |
| Content 4 | 7 (4th)       | 3                | 5th             |
| Content 5 | 6 (5th)       | 5                | 4th             |
| ⋮         |               |                  |                 |

First threshold: 7.5     Second threshold: 3.5

FIG. 6

|  | Ranking score | Preference score | Updated ranking |
|---|---|---|---|
| Content 1 | 20 (1st) | 3 | 2nd |
| Content 2 | 19 (2nd) | 3 | 3rd |
| Content 3 | 18 (3rd) | 4 | 4th |
| Content 4 | 17 (4th) | 7 | 1st |
| Content 5 | 16 (5th) | 4 | 6th |
| Content 6 | 15 (6th) | 5 | 5th |
| Content 7 | 14 (7th) | 4 | 7th |
| Content 8 | 13 (8th) | 3 | 8th |
| Content 9 | 12 (9th) | 4 | 9th |
| Content 10 | 11 (10th) | 3 | 10th |
| ⋮ |  |  |  |

Third threshold: 6.5    Fourth threshold: 4.5

FIG. 7

| Recommended Content for You | | |
|---|---|---|
| | Hirugao -Episode 1- [Mr. Hirugao and others become involved in an incident] Mr. Morimoto, who works for robbery-homicide division at Asagao police station, got stabbed by a man with scar on his cheek, and was found covered in blood. Then... | 2nd ranking Tag A |
| | Six secretaries -Episode 1- [Dark money of shrewd manager] The agency where Sasaki works as a manager has a reputation for being extremely competent in acquiring contracts. An incident happened that caused the division chief of the client to be changed, ... | 1st ranking Tag B |
| | My brother's lover -Episode 1- [Response to love Confession] The Asano children lost their parents in a car accident 10 years ago, so Masakazu, the elder brother, gave up his dream to go to school and instead supported his little sister, Naomi. Then, Masakazu found a lover. | 3rd ranking Tag B |
| | Singles party -Episode 1- [Tragedy of social media romance] Two friends, Akina and Junko, who are eager to get married attended the same singles party. At the party, Akina met an ideal man, but Junko has seen him somewhere. | 5th ranking Tag C |
| | Enjoy romance -Episode 1- [Tsundere Prince] Sayuri has been dating her boyfriend Taro for 6 years. She has been having trouble getting him to express his true feelings. Then, one day, ... | 4th ranking Tag D |

INFORMATION PROCESSING DEVICE, INFORMATION PROCESSING METHOD, AND RECORDING MEDIUM

CROSS-REFERENCE OF RELATED APPLICATIONS

This application is the U.S. National Phase under 35 U.S.C. § 371 of International Patent Application No. PCT/JP2022/033507, filed on Sep. 7, 2022, which in turn claims the benefit of Japanese Patent Application No. 2021-154871, filed on Sep. 22, 2021, the entire disclosures of which Applications are incorporated by reference herein.

TECHNICAL FIELD

The present disclosure relates to an information processing device, an information processing method, and a recording medium for estimating user preferences from the viewing history of broadcast content viewed by the user.

BACKGROUND ART

Patent Literature (PTL) 1 discloses an information processing device. The information processing device includes an obtainer, an analyzer, an evaluator, a visualizer, and a display. The obtainer obtains program information of a program (audience rating, program description, keywords, broadcast start time and end time, information related to performers, impressions of the program, the number of the impressions, the number of reuse of program introduction information, the number of comments that are sent to the official site of program P1, and usage history). The analyzer quantifies program information. The evaluator evaluates the program based on the numerical value obtained by the analyzer. The visualizer collectively converts the results of evaluation performed by the evaluator into graphical representation. The display presents the evaluation results that are graphically represented by the visualizer.

CITATION LIST

Patent Literature

[PTL 1] Japanese Unexamined Patent Application Publication No. 2006-60600

SUMMARY OF INVENTION

Technical Problem

The present disclosure provides an information processing device and the like that facilitates presentation of broadcast content arranged according to user preferences.

Solution to Problem

An information processing device according to one aspect of the present disclosure includes: an obtainer that obtains a ranking score assigned to each of a plurality of items of target broadcast content based on a total number of views of the target broadcast content; a preference outputter that outputs preference information based on a viewing history of one or more items of broadcast content viewed by a user in a past predetermined period, the preference information being related to a preference of the user for each of the one or more items of broadcast content; an evaluator that assigns a preference score to each of the plurality of items of target broadcast content, the preference score indicating a degree of matching between the target broadcast content and the preference information; and an order outputter that outputs order information based on the ranking score and the preference score, the order information being related to an order of the plurality of items of target broadcast content arranged according to the preference of the user.

An information processing method according to one aspect of the present disclosure includes: obtaining a ranking score assigned to each of a plurality of items of target broadcast content based on a total number of views of the target broadcast content; outputting preference information based on a viewing history of one or more items of broadcast content viewed by a user in a past predetermined period, the preference information being related to a preference of the user for each of the one or more items of broadcast content; assigning a preference score to each of the plurality of items of target broadcast content, the preference score indicating a degree of matching between the target broadcast content and the preference information; and outputting order information based on the ranking score and the preference score, the order information being related to an order of the plurality of items of target broadcast content arranged according to the preference of the user.

A non-transitory computer-readable recording medium for use in a computer, the recording medium having recorded thereon a computer program for causing the computer to execute the information processing method.

Advantageous Effects of Invention

The information processing system and the like according to the present disclosure has an advantage that it is easy to present broadcast content arranged more accordingly to user preferences.

BRIEF DESCRIPTION OF DRAWINGS

FIG. 3 illustrates an example of preference scores assigned to broadcast content according to the embodiment.

FIG. 4 illustrates an example of order information output according to the present embodiment.

FIG. 5 illustrates another example of the order information output according to the present embodiment.

FIG. 6 illustrates another example of the order information output according to the present embodiment.

FIG. 7 illustrates an example of a screen graphically representing broadcast content information, ranking scores, and preference information according to the embodiment.

DESCRIPTION OF EMBODIMENT (Underlying Knowledge Forming Basis of the Present Disclosure)

First, the inventors' point of view will be described below.

With the spread of terrestrial digital broadcasting and the increasing sophistication of recording devices, users can not only view broadcast content (television programs) in real time, but also view broadcast content at the time of their choosing. In addition to viewing broadcast content on stationary television receivers, the users can now also view broadcast content on portable terminals owned by the users, such as smartphones or tablet terminals. This has further diversified the opportunities for the users to view broadcast content. With such diversification of opportunities to view broadcast content, the number of items of broadcast content available to the users can be enormous. This makes it difficult for the users to select and view broadcast content that matches their preferences from among a large number of items of broadcast content.

Therefore, there have been attempts to estimate user preferences based on the viewing history of broadcast content viewed by users, and to recommend broadcast content that matches the estimated preferences to the users. However, there is a problem that it is difficult to estimate user preferences with sufficient accuracy by simply using the viewing history. For example, it is assumed that a user watches a particular program more frequently. In this case, when simply the viewing history is used, the genre of the particular program is expected to be estimated as user preferences. In reality, however, it is possible that the user prefers only some parts of the content included in the particular program, rather than the genre of the particular program.

In view of above, the inventors have arrived at the present disclosure.

Hereinafter, an embodiment will be described in detail with reference to the drawings as appropriate. However, more detailed explanation than necessary may be omitted. For example, detailed explanations of already well-known matters and duplicate explanations for substantially the same configuration may be omitted. This is to avoid unnecessary redundancy of the following description and to facilitate the understanding of those skilled in the art.

It should be noted that the inventors provide the accompanying drawings and the following description in order for those skilled in the art to fully understand the present disclosure, and are not intended to limit the subject matter described in the claims by these.

Embodiment

[1. Configuration]

Figure 1:
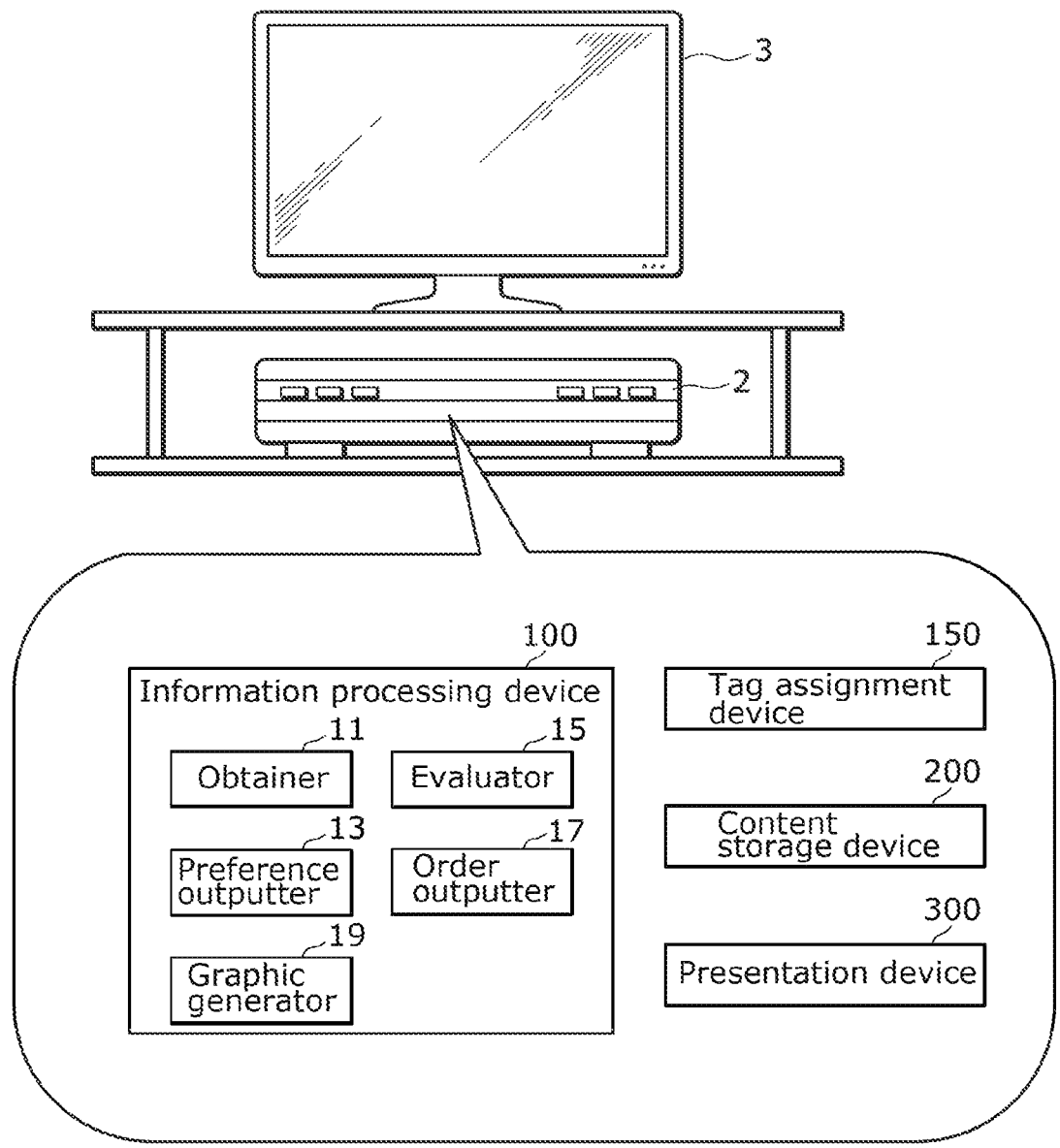
FIG. 1 is a schematic diagram illustrating a configuration of an information processing device and the like according to an embodiment.

Hereinafter, information processing device 100 and an information processing system using information processing device 100 according to an embodiment will be described with reference to FIG. 1. FIG. 1 is a schematic diagram illustrating a configuration of an information processing device and the like according to the embodiment. Information processing device 100 is a device for estimating user preferences based on the viewing history of broadcast content viewed by the user, and determining the order of presentation of a plurality of items of broadcast content to be recommended for viewing to the user. In the information processing system, tag assignment device 150, content storage device 200, and presentation device 300 are combined with information processing device 100, so that a plurality of items of broadcast content among a large number of items of broadcast content can be presented in the order that matches the user preferences estimated by information processing device 100.

In the present embodiment, information processing device 100 is mounted in recording device 2 that records television programs as broadcast content. Recording device 2 is connected to television receiver 3, and is capable of recording television programs received by television receiver 3 in response to a timer setting operation or the like made by a user. Information processing device 100 may be mounted in a television receiver with a recording function for recording television programs. Information processing device 100 may also be mounted in, for example, a server.

In the present embodiment, the broadcast content is terrestrial broadcast television programs. However, the present embodiment is not limited to such an example, but may include broadcasting satellites (BS) television programs, or communication satellites (CS) television programs, etc. The broadcasting content handled by information processing device 100 is not limited to television broadcasting content, but may include, for example, Internet broadcasting content provided by video sharing services.

As illustrated in FIG. 1, information processing device 100 includes obtainer 11, preference outputter 13, evaluator 15, order outputter 17, and graphic generator 19.

Obtainer 11 obtains a ranking score of each of a plurality of items of target broadcast content (hereinafter, may be simply referred to as broadcast content) that are presentation candidates to be recommended for viewing to the user. The "ranking score" here is an index of the popularity of each item of broadcast content based on the total number of views of the broadcast content. The ranking score is, for example, the total number of views (plays) of the broadcast content on terrestrial broadcast, or the highest value of the rate of viewers viewing the broadcast content at any given moment (viewer rate) among all broadcast waves. The ranking score may also take into account the total number of purchases of recording media such as optical discs on which the broadcast content is recorded, and the total number of times the recording media has been rented using the recording media rental service. The ranking score may also take into account the total number of views (plays) of the broadcast content using so-called on-demand distribution services. The ranking scores are provided by the statistics service providers that compile the above statistics. Accordingly, obtainer 11 obtains the ranking scores by accessing a server or the like operated by a statistics service provider.

Obtainer 11 also obtains the viewing history of broadcast content viewed by the user in a past predetermined period to estimate user preferences. The term "broadcast content viewed by the user" here includes broadcast content viewed by the user in real time on television receiver 3 without being recorded on recording device 2 and/or broadcast content for which timer recording was set to recording device 2 (i.e., broadcast content for which timer recording was set in the past and which broadcast in the past or which is to be broadcast in the future).

The term "predetermined period" here refers to the period of time required for sufficient amount of broadcast content to be accumulated to estimate user preferences. Accordingly, the predetermined period may be a variable period determined by the number of items of broadcast content, or may be a fixed period, such as one day, one week, or one month, in which a statistically sufficient amount of broadcast content is considered to be accumulated.

The term "viewing history" here includes the number of times the user has viewed the broadcast content and/or the date and time of the user's viewing of the broadcast content. The "viewing history" here also includes, for example, electronic program guide (EPG) information, and/or service information (SI) information which are program information, when the broadcast content is a television program. In other words, the "viewing history" includes the details of the broadcast content, the number of times the broadcast content was viewed, and/or the date and time of the viewing. The "details of the broadcast content" can include, for example, the genre, title, cast, voice actors and actresses, producer, director, original writer, and name of creator, etc. of the broadcast content. The genre can include, for example, documentary, news, variety, drama, and animation. In addition, the details of the "broadcast content" can include, for example, character strings describing the details of the broadcast content. In addition, the "viewing history" can include, for example, keywords entered by the user for searching for the broadcast content and/or the user evaluation on the broadcast content.

In the present embodiment, the viewing history of the broadcast content viewed by the user is stored in a storage (not illustrated) when the user views the broadcast content in real time on television receiver 3 or when the user makes an input for timer recording to recording device 2. Accordingly, in the present embodiment, obtainer 11 obtains the viewing history by reading the viewing history from the storage.

Preference outputter 13 outputs preference information related to the user preferences for the broadcast content based on the viewing history obtained by obtainer 11. The preference information includes one or more preference tags selected according to the user preferences from among a plurality of preference tags of different kinds corresponding to a plurality of preferences of different kinds of viewers. In other words, the preference information holds preference tags which match the user preferences and are extracted from among a plurality of preference tags. A plurality of kinds of preference tags may be set as appropriate for estimating the user preferences using information processing device 100. Here, preference tags are described as information corresponding to the above mentioned broadcast content genres (including documentary, news, variety, drama, animation, etc.). When the preference information output by preference outputter 13 is stored in the storage, it is not necessary to generate preference information from the viewing history of the user. In this case, preference outputter 13 may simply read the generated preference information from the storage and output the preference information.

Evaluator 15 assigns, to each of the plurality of items of target broadcast content, a preference score indicating the degree of matching between the target broadcast content and the preference information. The preference information includes one or more preference tags that are selected according to user preferences from among a plurality of kinds of preference tags as described above. Based on the degree of matching between one or more preference tags previously assigned to each of the plurality of items of target broadcast content and the one or more preference tags included in the preference information, evaluator 15 assigns a preference score to the target broadcast content.

The assignment of preference tags to the target broadcast content is performed by tag assignment device 150. Tag assignment device 150 is a device that assigns preference tags to broadcast content. In the present embodiment, an example will be described in which tag assignment device 150 assigns preference tags to be used in the processing of information processing device 100. However, the preference tags may be assigned by an external entity (e.g., a broadcast content distribution provider). Tag assignment device 150 is a processor realized by a processor, a memory, and a program stored in the memory.

Tag assignment device 150 includes AI models trained by learning for each kind of preset preference tag. For example, when twenty kinds of preference tags are set, tag assignment device 150 includes twenty AI models corresponding to the twenty kinds of preference tags. Tag assignment device 150 receives input of EPG information and SI information, etc., for broadcast content. Then, by inputting the received EPG information and SI information, etc. into each AI model sequentially or in parallel, tag assignment device 150 outputs information related to whether or not one preference tag set to each AI model is to be assigned to the broadcast content with the EPG information, SI information, etc. Tag assignment device 150 assigns a preference tag to be assigned to the broadcast content based on the result output from the AI model.

Subsequently, evaluator 15 obtains information related to the target broadcast content after the assignment of the preference tag output from tag assignment device 150. Evaluator 15 calculates, based on the preference information, the degree of matching between the preference tags assigned to the target broadcast content and the preference tags in the preference information. Evaluator 15, for example, assigns a high preference score to the target broadcast content with the high matching degree calculated and a low preference score to the target broadcast content with the low matching degree calculated.

Order outputter 17 outputs order information related to the order of a plurality of items of target broadcast content arranged according to user preferences, based on the ranking score and the preference score. The details of order outputter 17 will be described below, along with an operation of information processing device 100.

Content storage device 200 is a device for storing broadcast content, and is realized by semiconductor memory, etc. Content storage device 200 records and stores, for example, all broadcast content simultaneously broadcast by terrestrial broadcasting. The user is able to select and view any broadcast content from among the broadcast content stored in content storage device 200.

Presentation device 300 reads the target broadcast content based on the order information output by order outputter 17. Presentation device 300 then presents the target broadcast content in the order that matches the user preferences by, for example, listing the target broadcast content on the display of television receiver 3. Presentation device 300 includes, for example, a controller that reads broadcast content information from content storage device 200 and a decoder that performs conversion for projection on the display.

When one or more items of target broadcast content, which have been selected according to the order output by order outputter 17 and which are to be presented to the user, are presented on presentation device 300, an image described below may be presented on presentation device 300. The image includes, along with the selected broadcast content, (i) information related to the details of the broadcast content, (ii) information related to the ranking score of the broadcast content, and (iii) tag information related to preference tags which have been assigned to the broadcast content and which match the user preference information. In this case, the image presented by presentation device 300 is generated by graphic generator 19. Graphic generator 19 collectively generates an image including the selected target broadcast content, information related to the details of the target broadcast content, the ranking scores, and the tag information. The image allows the user to recognize the information at a glance.

FIG. 7 illustrates an example of a display screen when the image generated by graphic generator 19 is presented by presentation device 300. The information related to the image indicating the details of the target broadcast content and text information indicating the details of the target broadcast content from content storage device 200 are presented. The EPG information and/or SI information attached to the target broadcast content may be used for the text information here. In addition, the ranking converted from the ranking score as the basis for recommending the target broadcast content, and the preference tags that match between the target broadcast content and preference information as the reason that the order is different from the ranking are displayed as icons. By displaying such information, the user is able to check his or her own preference information used as a basis for the target broadcast content recommendation, which motivates the user to view the target broadcast content.

[2. Operation]

Figure 2:
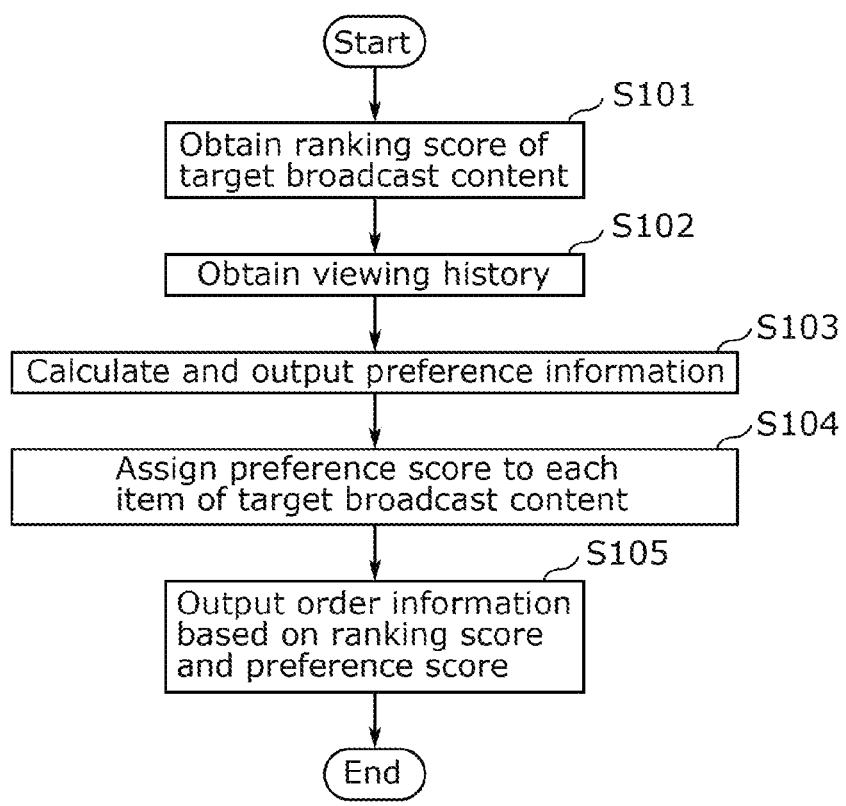
FIG. 2 is a flowchart illustrating an example of processes performed by the information processing device according to the embodiment.

An operation of information processing device 100 configured as above will be described with reference to FIG. 2 to FIG. 5 below. FIG. 2 is a flowchart illustrating an example of processes performed by the information processing device according to the embodiment.

First, obtainer 11 obtains the ranking score of the target broadcast content by accessing an external server via the network or the like (obtaining step S101). At this time, obtainer 11 creates an index of the target broadcast content stored in content storage device 200 by referring to content storage device 200 in advance. Obtainer 11 then obtains the ranking score of each item of target broadcast content on the index, and adds the ranking scores of the target broadcast content in the index.

Next, obtainer 11 obtains the viewing history of the user from the storage (step S102). Preference outputter 13 calculates and outputs preference information based on the viewing history of the user obtained by the obtainer (preference output step S103).

Next, evaluator 15 assigns a preference score to each item of target broadcast content (evaluation step S104). Specifically, evaluator 15 sequentially inputs the target broadcast content on the index to tag assignment device 150 to cause tag assignment device 150 to assign preference tags to the target broadcast content. Evaluator 15 obtains the preference information output from preference outputter 13, and reads the preference tags which are included in the preference information and which are consistent with the user preferences. Evaluator 15 then calculates the degree of matching between the target broadcast content with the preference tags assigned and the preference tags included in the preference information. Evaluator 15 assigns a preference score to the target broadcast content based on the calculation results for the target broadcast content. FIG. 3 illustrates an example of preference scores assigned to broadcast content according to the embodiment. In FIG. 3, the first row indicates the kinds of preference tags (tag A, tag B, . . . ), the first column indicates the identification numbers of the target broadcast content (content 1, content 2, . . . ), and the corresponding cell indicates the numerical value indicating whether or not the preference tag has been assigned to the target broadcast content. In the example of FIG. 3, presence or absence of the preference tag is expressed by "1" (an example of a first value) indicating that the preference tag has been assigned, and "0" (an example of a second value) indicating that the preference tag has not been assigned. For example, the preference tag of tag A has been assigned to content 1 and the preference tags of tag B, tag C and tag D have not been assigned to content 1.

Here, it is assumed that there is a user with preference information that includes tag A, tag B, and tag C, and does not include tag D. For the user, since the preference tags assigned to content 4 matches the preference tags in the preference information, content 4 has a highest preference score. Of content 2 with tag A and tag B that match the preference tags in the preference information and content 3 with tag B and tag C that match the preference tags in the preference information, content 2 has a higher degree of matching due to the presence or absence of tag D that is not included in the preference information. Preference scores are assigned accordingly to content 2 and content 3. The degree of matching of content 1 is the lowest, and a lowest preference score is assigned to content 1.

The preference score assigned may simply be a score based on the ranking of the degree of matching among a plurality of items of target broadcast content. Alternatively, the degree of matching may be adjusted (addition or subtraction may be performed) for each preference tag, and the calculation result may be output as it is as a preference score. In this case, a negative numerical value may be assigned to the preference score of the target broadcast content on which only subtractions were performed (target broadcast content with a low matching degree).

Description is given referring to FIG. 2 again. Order outputter 17 outputs order information based on both the ranking score and the preference score (order output step S105). An example of the output of order information by order outputter 17 will be described below.

2-1. Output Example 1

FIG. 4 illustrates an example of order information output according to the present embodiment. In FIG. 4, the first row indicates the kinds of score, the first column indicates the identification numbers of target broadcast content, and the corresponding cell indicates the numerical value assigned as the score to the target broadcast content. As illustrated in FIG. 4, content 1 has the highest ranking score (highest ranking), followed by content 2, content 3, content 4, and content 5.

In other words, the second column of FIG. 4 indicates the order of a plurality of items of target broadcast content arranged in descending order of ranking score. As illustrated in FIG. 4, content 3 has the highest preference score (matches the user preference information), followed by content 2, content 5, content 1, and content 4.

In this example, order outputter 17 calculates the total score by adding the ranking score and the preference score, and outputs order information related to the order of a plurality of items of target broadcast content arranged in descending order of total score. For example, order outputter 17 outputs the total score. Presentation device 300 then presents a plurality of items of target broadcast content in the order of content 3, content 2, content 1, content 5, and content 4 in the example in FIG. 4.

In addition to the above, the total score may be calculated by multiplying each score value by a weight factor according to whether the ranking score or the preference score is more important, and then performing addition. Instead of using the addition, the total score may be calculated by multiplying the ranking score by the preference score. The method of calculating the total score may be set to information processing device 100 in advance, or may be manually switchable by the user. For example, for the presented order, a question such as "would you like to change the presented order into another order?" is displayed to make the order different from the order already presented to the user. When a response of yes is entered to the question, a different method of calculating the total score with a different weight factor or with multiplication is applied, and information related to a different order is output.

2-2. Output Example 2

FIG. 5 illustrates another example of the order information output according to the present embodiment. In FIG. 5, the first row indicates the kinds of score, the first column indicates the identification numbers of the target broadcast content, and the corresponding cell indicates the numerical value assigned as the score to the target broadcast content. As illustrated in FIG. 5, content 1 has the highest ranking score (highest in ranking), followed by content 2, content 3, content 4, and content 5. Moreover, as illustrated in FIG. 5, content 3 has the highest preference score (matches the user preference information), followed by content 2, content 5, content 1, and content 4.

In this example, order outputter 17 updates the order of the plurality of items of target broadcast content arranged in descending order of ranking score to increase, from the original ranking, the ranking of the target broadcast content with the preference score that is higher than a first threshold value, and decrease, from the original ranking, the ranking of the target broadcast content with the preference score that is lower than a second threshold value. Order outputter 17 then outputs the updated order information.

For example, order outputter 17 compares the preference scores with the first threshold value and the second threshold value. Order outputter 17 then updates the ranking information to increase, from the original ranking, the ranking of the target broadcast content with the preference score that is higher than the first threshold value (in the bold rectangle in FIG. 5). Order outputter 17 also updates the ranking information to decrease, from the original ranking, the ranking of the target broadcast content with the preference score that is lower than the second threshold value (in the bold dashed rectangle in FIG. 5). By performing the processes on all items of target broadcast content, order outputter 17 outputs information related to the updated order. Presentation device 300 then presents, in the example in FIG. 5, a plurality of items of target broadcast content in the order of content 3, content 1, content 2, content 5, and content 4.

The ranking of the target broadcast content with the preference score that is higher than the first threshold value may be increased in any manner. For example, the ranking of the target broadcast content with the preference score that is higher than the first threshold value may be increased from the original ranking by a fixed number of ranks, such as one, two, or three ranks. Alternatively, the ranking of the target broadcast content with the preference score that is higher than the first threshold value may be increased to the highest. In a similar manner, the ranking of the target broadcast content with the preference score that is lower than the second threshold value may be decreased in any manner. For example, the ranking of the target broadcast content with the preference score that is lower than the second threshold value may be decreased from the original ranking by a fixed number of ranks, such as one, two, or three ranks. Alternatively, the ranking of the target broadcast content with the preference score that is lower than the second threshold value may be decreased to the lowest.

Two or more first threshold values may be used to increase the ranking of broadcast content, or two or more second threshold values may be used to decrease the ranking of broadcast content. In the following description, of two first threshold values, the threshold value with a higher preference score is a third threshold value, and the threshold value with a lower preference score is a fourth threshold value. For example, the ranking information is updated to increase the ranking of broadcast content with a preference score that is higher than the third threshold value by three ranks from the original ranking. Moreover, the ranking information may be updated to increase the ranking of broadcast content with a preference score that is higher than the fourth threshold value by one rank from the original ranking. An example will be described with reference to FIG. 6. FIG. 6 illustrates another example of the order information output according to the present embodiment.

The example in FIG. 6 illustrates the case where the third threshold value is set to 6.5 and the fourth threshold value is set to 4.5. Since the preference score of content 4 (in the bold rectangle in FIG. 6) is higher than the third threshold value, the ranking of content 4 is increased by three ranks, so that the ranking becomes content 4, content 1, content 2, content 3, content 5, content 6, content 7, content 8, content 9, and content 10 in this order. Next, since the preference score of content 6 (in the bold dashed rectangle in FIG. 6) is higher than the fourth threshold value, the order information is updated to increase the ranking of content 6 by one rank, so that the ranking becomes content 4, content 1, content 2, content 3, content 6, content 5, content 7, content 8, content 9, and content 10 in this order. In such a manner, the example in FIG. 6 illustrates the result of presenting a plurality of items of target broadcast content when the ranking was changed based on the third threshold value and then the ranking was changed based on the fourth threshold value. When the ranking of the broadcast content is changed based on a plurality of threshold values, for example, the ranking information may be updated by changing the ranking based on the fourth threshold value and then changing the ranking based on the third threshold value.

With this, the ranking of a plurality of items of broadcast content can also be changed based on a plurality of threshold values. The use of a plurality of threshold values can also be applied in the same manner to the second threshold value. In other words, assume that of two second threshold values, the threshold value with a higher preference score is a fifth threshold value and the threshold value with a lower preference score is a sixth threshold value. In this case, the ranking information may be updated to decrease the ranking of broadcast content with a preference score that is lower than the fifth threshold value by three ranks from the original ranking, and to decrease the ranking of broadcast content with a preference score that is lower than the sixth threshold value by one rank from the original ranking.

In this way, the target broadcast content is presented not (i) in the ranking corresponding to the usual ranking score nor (ii) in the ranking corresponding to simple user preference information, but is presented in a combination of (i) and (ii). The total number of items of target broadcast content presented may be fixed. For example, content storage device 200 may store a large number of items of broadcast content. In this case, since the possibility that the user will select the broadcast content that has the lowest order of presentation is quite low, this broadcast content may be excluded from the candidate target broadcast content. For example, among the broadcast content stored in content storage device 200, only the predetermined number of items of broadcast content of top ranking scores may be set as target broadcast content, and broadcast content with the ranking scores lower than those may not be set as target broadcast content.

In this way, information processing device 100 and the information processing system according to the present embodiment are capable of presenting broadcast content arranged more accordingly to user preferences while still being consistent with the ranking scores.

(Variations)

The embodiment has been described above as an example of the technique disclosed in the present application. However, the technique according to the present disclosure is not limited to the above example, and can be applied to embodiments in which changes, replacements, additions, omissions, etc. are made as appropriate. Moreover, each structural element described in the above embodiment can be combined to form a new embodiment.

Variations of the embodiment will be described below.

For example, in the above embodiment, information processing device 100 is realized as a single device, but may be realized by a plurality of devices. When information processing device 100 is realized by a plurality of devices, the structural elements included in information processing device 100 may be distributed to the devices in any manner. In other words, the present disclosure may be realized by cloud computing, or by edge computing.

For example, in the embodiment, all or part of the structural elements included in information processing device 100 according to the present disclosure may be configured by a dedicated hardware, or may be realized by executing a software program suitable for each structural element. Moreover, each structural element may be realized by a central processing unit (CPU) or a program execution unit such as a processor reading the software program recorded on a recording medium such as a hard disk drive (HDD) or semiconductor memory and executing the software program.

The structural elements included in information processing device 100 according to the present disclosure may be formed by a single electronic circuit or a plurality of electronic circuits. The single electronic circuit or each of the plurality of electronic circuits may be a general-purpose circuit or a dedicated circuit.

The single electronic circuit or the plurality of electronic circuits may include, for example, a semiconductor device, an integrated circuit (IC), or a large scale integration (LSI). The IC or LSI may be integrated into a single chip or a plurality of chips. The name used here is IC or LSI, but it may also be called system LSI, very large scale integration (VLSI), or ultra large scale integration (ULSI) depending on the degree of integration. A field programmable gate array (FPGA) that can be programmed after manufacturing an LSI can be used for the same purpose.

Moreover, the general or specific aspects of the present disclosure may be realized by a system, a device, a method, an integrated circuit, or a computer program. Alternatively, the general or specific aspects may be realized by a computer-readable non-transitory recording medium such as an optical disk, HDD, or semiconductor memory in which the computer program is stored. For example, the present disclosure may be realized as a program for causing a computer to execute the control method according to the embodiment. The program may be recorded in a non-transitory recording medium such as a computer-readable CD-ROM, or be distributed via a communication path such as the Internet.

The embodiment has been described above and exemplified as the technique of the present disclosure. Appended drawings and detailed descriptions have been provided for that purpose.

Accordingly, the structural elements described in the appended drawings and the detailed descriptions can include not only essential structural elements for exemplifying the above described technique, but also structural elements that are not essential. Therefore, it should not be immediately construed that these structural elements that are not essential are essential even if the structural elements are described in the appended drawings and the detailed descriptions.

Since the above described embodiment is for exemplifying the technique of the present disclosure, various modifications, replacements, additions, omissions, and the like can be made within the scope of the appended claims or of their equivalents.

CONCLUSION

As described above, information processing device 100 according to a first aspect of the embodiment includes: obtainer 11 that obtains a ranking score assigned to each of a plurality of items of target broadcast content based on a total number of views of the target broadcast content; preference outputter 13 that outputs preference information based on a viewing history of one or more items of broadcast content viewed by a user in a past predetermined period, the preference information being related to a preference of the user for each of the one or more items of broadcast content; evaluator 15 that assigns a preference score to each of the plurality of items of target broadcast content, the preference score indicating a degree of matching between the target broadcast content and the preference information; and order outputter 17 that outputs order information based on the ranking score and the preference score, the order information being related to an order of the plurality of items of target broadcast content arranged according to the preference of the user.

Information processing device 100 described above is capable of outputting order information different from both (i) the order corresponding to the ranking score that is based on the number of views of each item of the target broadcast content and (ii) the order corresponding to the preference score based on simple user preferences. The output order information is related to the order of a combination of (i) and (ii). In other words, information processing device 100 according to the present embodiment is capable of outputting order information related to the order of presentation of the target broadcast content that enables presentation of the target broadcast content arranged more accordingly to user preferences while being consistent with the ranking score. Accordingly, information processing device 100 has an advantage that broadcast content arranged more accordingly to user preferences can be easily presented.

Moreover, for example, information processing device 100 according to a second aspect of the embodiment may be information processing device 100 according to the first aspect in which the preference information includes one or more preference tags selected according to the preference of the user from among a plurality of preference tags of different kinds corresponding to a plurality of preferences of different kinds of a viewer, and evaluator 15 assigns the preference score to each of the plurality of items of target broadcast content based on a degree of matching between one or more preference tags assigned to the target broadcast content and the one or more preference tags included in the preference information.

With this, a preference score indicating whether the target broadcast content is consistent with user preferences is assigned according to the degree of matching between the preference tags assigned to the target broadcast content and the preference tags that are consistent with user preferences.

Then, how much the target broadcast content is consistent with user preferences can be compared by the magnitude of the preference score.

Moreover, for example, information processing device 100 according to a third aspect of the embodiment is information processing device 100 according to the second aspect that includes: graphic generator 19 that generates an image including, along with each of one or more items of target broadcast content that is selected according to the order information outputted and to be presented to the user, (i) information related to details of the target broadcast content, (ii) information related to the ranking score of the target broadcast content obtained, and (iii) tag information related to the one or more preference tags assigned to the target broadcast content, the tag information matching the preference information of the user.

With this, an image can be generated and presented. The image includes, along with the broadcast content, (i) information related to the details of the broadcast content, (ii) the ranking score assigned to the broadcast content, and (iii) the tag information of the preference tag assigned to the broadcast content, which matches the user preference information. In other words, the user is able to recognize, at a glance, the information, i.e., how the order of the target broadcast content being presented was determined.

Moreover, for example, information processing device 100 according to a fourth aspect of the embodiment is information processing device 100 according to any one of the first to third aspects in which the order outputter updates an order of the plurality of items of target broadcast content arranged in descending order of the ranking score to increase, from an original ranking, a ranking of target broadcast content with the preference score that is higher than a first threshold value.

With this, the order information is updated to increase the order of the target broadcast content with a preference score which is higher than the first threshold value and which is considered to be relatively consistent with user preferences. This has an advantage that it is easier for the user to select the target broadcast content which is presented at a higher rank and which is more consistent with user preferences. The first threshold value may be set experimentally or empirically, for example, because the first threshold value is almost always unique to each user.

Moreover, for example, information processing device 100 according to a fifth aspect of the embodiment is information processing device 100 according to any one of the first to fourth aspects in which order outputter 17 updates an order of the plurality of items of target broadcast content arranged in descending order of the ranking score to decrease, from an original ranking, a ranking of target broadcast content with the preference score that is lower than a second threshold value.

With this, the order information is updated to decrease the order of the target broadcast content which has a preference score that is lower than the second threshold value and which is considered to be relatively not consistent with user preferences. This has an advantage that the user is less likely to select the target broadcast content that is less consistent with user preferences presented at a lower rank, and is more likely to relatively select target broadcast content which is different from the above target broadcast content and which is more consistent with user preferences. The first threshold value may be set experimentally or empirically, for example, because the first threshold value is almost always unique to each user.

Moreover, for example, information processing device 100 according to a sixth aspect of the embodiment is information processing device 100 according to any one of the first to third aspects in which order outputter 17 calculates a total score based on the ranking score and the preference score, and outputs order information related to an order of the plurality of items of target broadcast content arranged in descending order of the total score calculated.

With this, order information related to the order of a plurality of items of target broadcast content can be output according to the total score calculated by computing the ranking score and the preference score.

Moreover, for example, information processing device 100 according to a seventh aspect of the embodiment is information processing device 100 according to the sixth aspect in which the total score is calculated by adding the preference score to the ranking score.

With this, order information related to the order of a plurality of items of target broadcast content can be output according to the total score calculated by adding the ranking score and the preference score.

Moreover, for example, information processing device 100 according to an eighth aspect of the embodiment is information processing device 100 according to the sixth aspect in which the total score is calculated by multiplying the ranking score by the preference score.

With this, order information related to the order of a plurality of items of target broadcast content can be output according to the total score calculated by multiplying the ranking score by the preference score.

Moreover, an information processing method according to a ninth aspect of the embodiment includes: obtaining a ranking score assigned to each of a plurality of items of target broadcast content based on a total number of views of the target broadcast content; outputting preference information based on a viewing history of one or more items of broadcast content viewed by a user in a past predetermined period, the preference information being related to a preference of the user for each of the one or more items of broadcast content; assigning a preference score to each of the plurality of items of target broadcast content, the preference score indicating a degree of matching between the target broadcast content and the preference information; and outputting order information based on the ranking score and the preference score, the order information being related to an order of the plurality of items of target broadcast content arranged according to the preference of the user.

With this, the same advantageous effects as information processing device 100 described above can be achieved.

Moreover, a non-transitory computer-readable recording medium for use in a computer according to a tenth aspect of the embodiment is the recording medium having recorded thereon a computer program for causing the computer to execute the information processing method according to the ninth aspect.

With this, by causing one or more processors to execute the information processing method described above, the same advantageous effects as information processing device 100 described above can be achieved.

INDUSTRIAL APPLICABILITY

The present disclosure is applicable to, for example, a system for estimating user preferences based on the viewing history of broadcast content viewed by a user.

The invention claimed is:

1. An information processing device comprising:
   an obtainer that obtains a ranking score assigned to each of a plurality of items of target broadcast content based on a total number of views of the target broadcast content;
   a preference outputter that outputs preference information based on a viewing history of one or more items of broadcast content viewed by a user in a past predetermined period, the preference information being related to a preference of the user for each of the one or more items of broadcast content;
   an evaluator that assigns a preference score to each of the plurality of items of target broadcast content, the preference score indicating a degree of matching between the target broadcast content and the preference information; and
   an order outputter that outputs order information based on the ranking score and the preference score, the order information being related to an order of the plurality of items of target broadcast content arranged according to the preference of the user,
   wherein the order outputter updates the order of the plurality of items of target broadcast content arranged in descending order of the ranking score to decrease, from an original ranking, a ranking of target broadcast content with the preference score that is lower than a first threshold value.

2. The information processing device according to claim 1,
   wherein the preference information includes one or more preference tags selected according to the preference of the user from among a plurality of preference tags of different kinds corresponding to a plurality of preferences of different kinds of a viewer, and
   the evaluator assigns the preference score to each of the plurality of items of target broadcast content based on a degree of matching between one or more preference tags assigned to the target broadcast content and the one or more preference tags included in the preference information.

3. The information processing device according to claim 2, comprising:
   a graphic generator that generates an image including, along with each of one or more items of target broadcast content that is selected according to the order information outputted and to be presented to the user, (i) information related to details of the target broadcast content, (ii) information related to the ranking score of the target broadcast content obtained, and (iii) tag information related to the one or more preference tags assigned to the target broadcast content, the tag information matching the preference information of the user.

4. The information processing device according to claim 1,
   wherein the order outputter updates the order of the plurality of items of target broadcast content arranged in descending order of the ranking score to increase, from the original ranking, the ranking of target broadcast content with the preference score that is higher than a second threshold value.

5. An information processing method comprising:
   obtaining a ranking score assigned to each of a plurality of items of target broadcast content based on a total number of views of the target broadcast content;
   outputting preference information based on a viewing history of one or more items of broadcast content viewed by a user in a past predetermined period, the preference information being related to a preference of the user for each of the one or more items of broadcast content;
   assigning a preference score to each of the plurality of items of target broadcast content, the preference score indicating a degree of matching between the target broadcast content and the preference information; and
   outputting order information based on the ranking score and the preference score, the order information being related to an order of the plurality of items of target broadcast content arranged according to the preference of the user,
   wherein the order information updates the order of the plurality of items of target broadcast content arranged in descending order of the ranking score to decrease, from an original ranking, a ranking of target broadcast content with the preference score that is lower than a threshold value.

6. A non-transitory computer-readable recording medium for use in a computer, the recording medium having recorded thereon a computer program for causing the computer to execute the information processing method according to claim 5.

* * * * *